J. J. AND E. J. FREIBURGER.
GUARD FOR AUTOMOBILE CRANK CASES.
APPLICATION FILED OCT. 31, 1921.

1,412,049.

Patented Apr. 11, 1922.

J. J. Freiburger and
E. J. Freiburger
Inventors
Attorney.

UNITED STATES PATENT OFFICE.

JOSEPH J. FREIBURGER AND EARL J. FREIBURGER, OF FORT WAYNE, INDIANA.

GUARD FOR AUTOMOBILE CRANK CASES.

1,412,049.  Specification of Letters Patent.  Patented Apr. 11, 1922.

Application filed October 31, 1921. Serial No. 511,953.

*To all whom it may concern:*

Be it known that we, JOSEPH J. FREIBURGER and EARL J. FREIBURGER, citizens of the United States, residing at Fort Wayne, in the county of Allen and State of Indiana, have invented new and useful Improvements in Guards for Automobile Crank Cases, of which the following is a specification.

The invention relates to guards for crank cases of automobiles.

In the crank cases of the Ford motors and other motors, the case, rearwardly of the cylinder block, is enlarged to accommodate the magneto and the transmission mechanism, the portion of the case connecting the enlarged portion and the cylinder block portion being sloped downwardly at its bottom side. Access to the case is afforded by an opening in the bottom of the cylinder block portion of the case, the opening being normally closed by a cover. In the Ford motor the fourth cylinder, or that nearest the dash of the vehicle, is positioned beyond the opening and over the sloping bottom of the case, hence access to the connecting rod of that cylinder is difficult and frequently a pin or some other part of the connections between the crank shaft and the piston drops down the sloping bottom of the case into engagement with the magneto short-circuiting the entire electrical system on the vehicle. To remove the foreign body from the enlarged portion of the crank case it is practically impossible to do otherwise than to tear down the entire motor.

The object of our invention is to provide an exceedingly simple means for such crank cases by which the danger of foreign bodies dropping down the sloping bottom and short-circuiting the magneto is eliminated, the said means being readily installed in the case whether or not the motor is assembled on the case.

The invention consists in a guard having an open top and one open end adapted to be inserted in the crank case of a motor and placed over the inclined portion of the bottom of the case.

In the accompanying drawings we have illustrated the invention in simple form as applied to a Ford motor, in which—

Figure 1:
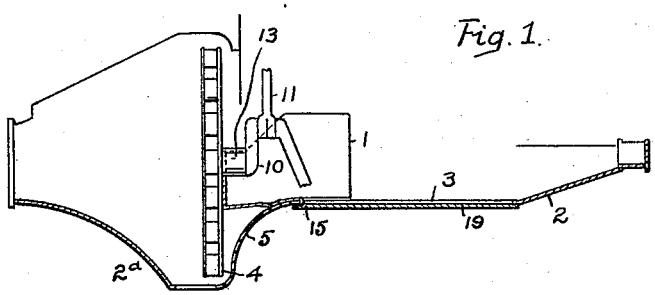
Figure 3:
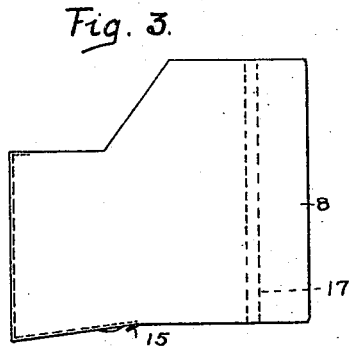
Figure 4:
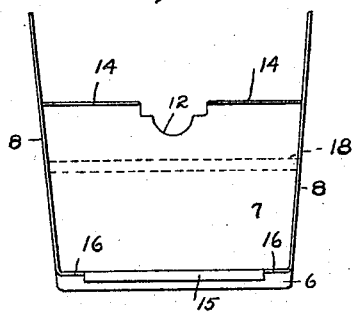
Figure 2:
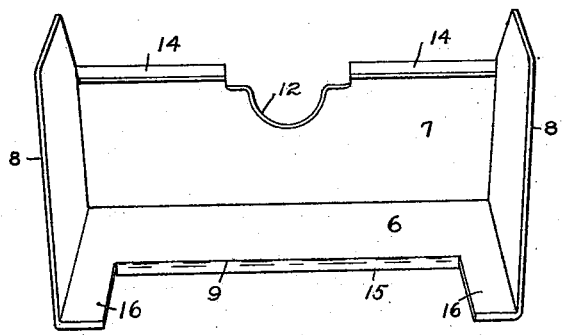

Figure 1 is a longitudinal sectional view of a Ford motor having the invention applied thereto; Fig. 2 a perspective view of the guard; Fig. 3 a side elevational view of the guard and Fig. 4 an end view of the same.

Referring to the drawings, the guard is a box like structure 1 (Fig. 1) formed of suitable material, preferably flexible in nature in order that it may be readily installed in the crank case 2 of the motor. The material of the guard may be rubberized fabric formed in the desired shape and then vulcanized. However, the material out of which the guard is made or the manner in which the guard is produced is not important to the invention, except as one material may be better suited for the purpose than another. The rubberized fabric material is well suited for our purpose since the guard may be collapsed more or less for insertion through the opening 3 in the bottom of the crank case and then moved along the bottom of the case until it abuts the magneto coil support 4 mounted in the enlarged portion $2^a$ of the case. In this position the bottom of the guard spans the sloping wall 5 of the bottom of the case and therefore shuts off access or communication between the portion $2^a$ of the case and the cylinder block portion 2.

The guard consists of a bottom 6, an end wall 7 and two side walls 8, the end walls projecting beyond the free end 9 of the bottom and also for a portion of their length projecting above the end wall 7. The side walls flare outwardly to conform to the contour of the case 2, their rear upper ends adjacent the end wall 7 being reduced in height to obviate interference with the operation of the crank shaft 10 and the connecting rod 11 of the fourth cylinder (not shown). The upper edge of the end wall is cut out at its central portion as shown at 12 to permit the said end to be engaged under the crank shaft bearing 13 and between said cut out portion and the ends of the wall lateral flanges 14 are formed along the upper edge of the wall to reinforce the wall and prevent its collapse.

At the forward end of the bottom 6 the material of the same is turned under to form a flange 15 for engagement with the rear rim of the opening 3 in the bottom of the case 2 and thereby lock the guard in position and prevent its further movement down the incline 5. The bottom 6 also slopes upwardly from the end wall 7 to its flange 15. A flange 16 extends inwardly from the lower edge of the projecting portion of each side wall to reinforce the same and also to aid in sustaining the said walls in proper relation with the wall of the case 2.

If desirable a spring 17 may be embedded in the material of the bottom and of each side wall 8 to ensure engagement of the side walls with the wall of the case and a spring 18 may be embedded in the end wall 7 to prevent buckling of that wall. However, these springs may be omitted if the material out of which the guard is made is sufficiently strong and flexible to stand up properly and engage the wall of the case. The springs are intended as precautionary measures only.

When the guard is installed it is collapsed sufficiently to permit of its insertion through the opening 3 in the case, the opening, of course, being relatively narrow. When inserted through the opening it is readily moved along the bottom of the case into engagement with the magneto coil support and the notched end wall engaged under the crank shaft bearing. When placed in proper position, the flange 15 engages over the end wall of the opening 3 and when the cover 19 is secured in place it clamps the flange to the case, and dislodgment of the guard from its proper position is avoided. When in this position any article falling from the crank shaft or the connecting rod of the fourth cylinder drops into the guard and is supported therein, the removal of the same from the guard being readily accomplished by merely inserting the hand through the opening 3 in the case and into the guard.

It will be noted that the magneto coil support 4 forms a closure for a portion of the end of the crank case 2 and that when the guard is engaged on it and locked by the flange 15 the guard is fixed, but subject to removal at any time.

What we claim is:

1. In combination with the crank case of an internal combustion engine, of a guard at one end of the case having an open top and one open end and having its side walls engaging the opposite walls of the case and means to secure the guard in position for the purposes described.

2. In combination with the crank case of an internal combustion engine, of a hollow guard at one end of the case having an open top and one open end and having its opposite side walls engaging the opposite walls of the case and its bottom engaged on the bottom of the case as and for the purposes described.

3. In combination with the crank case of an internal combustion engine having a downwardly sloping bottom at one end, of a guard disposed over the said downwardly sloping bottom having its side walls engaging the opposite walls of the case and a portion of its bottom engaged on the bottom of the case, the guard being hollow and having an open top, and means to secure the guard in position.

4. In combination with the crank case of an internal combustion engine having a bearing at one end and a crank shaft supported in the bearing, the bottom of the case sloping downwardly beneath said bearing, of a guard disposed over the said sloping portion of the bottom having a wall engaged under the said bearing and having its side walls engaged on the opposite walls of the case, the guard being hollow and having an open top, and means to secure the guard in position.

5. In combination with the crank case of an internal combustion engine having a bearing at one end and a crank shaft supported in the bearing, of a hollow guard formed of flexible material disposed at said end of the case having an open top and one open end, the end wall of the guard having engagement with the bearing and the side walls having engagement with the opposite side walls of the case.

6. In combination with the crank case of an internal combustion engine, a magneto-coil-supporting plate at one end of the case, a crank shaft bearing at said end of the case, a hollow guard having an end wall engaging the said plate and its upper edge engaging the said bearing, the side walls of the guard having engagement with the opposite side walls of the case and extending forwardly from the said end wall and beyond the bottom of the guard, a depending flange at the forward end of the bottom of the guard and means to clamp the said flange to the bottom of the case.

In witness whereof we have hereunto subscribed our names this 20th day of October, 1921.

JOSEPH J. FREIBURGER.
EARL J. FREIBURGER.